(12) United States Patent
Yamamoto et al.

(10) Patent No.: US 8,990,724 B2
(45) Date of Patent: Mar. 24, 2015

(54) INFORMATION PROCESSING APPARATUS, CONTROL METHOD THEREFOR, AND STORAGE MEDIUM

(75) Inventors: Masahito Yamamoto, Tokyo (JP); Hisashi Nakamoto, Yokohama (JP); Satoki Watariuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 12/880,971

(22) Filed: Sep. 13, 2010

(65) Prior Publication Data

US 2011/0078683 A1 Mar. 31, 2011

(30) Foreign Application Priority Data

Sep. 29, 2009 (JP) ................................. 2009-225571
Jun. 23, 2010 (JP) ................................. 2010-143027

(51) Int. Cl.
*G06F 3/048* (2013.01)
*G06F 9/44* (2006.01)
*G06F 17/30* (2006.01)
*H04N 1/00* (2006.01)

(52) U.S. Cl.
CPC ........ *G06F 9/4443* (2013.01); *G06F 17/30861* (2013.01); *H04N 1/00204* (2013.01); *H04N 1/00244* (2013.01); *H04N 1/00278* (2013.01); *H04N 1/00408* (2013.01); *H04N 1/00424* (2013.01); *H04N 1/00474* (2013.01); *H04N 1/00503* (2013.01); *H04N 1/00973* (2013.01); *H04N 2201/0039* (2013.01); *H04N 2201/0094* (2013.01)
USPC ............ 715/773; 715/770; 715/753; 715/800

(58) Field of Classification Search
CPC .................................................. G06F 17/30861
See application file for complete search history.

(56) References Cited

U.S. PATENT DOCUMENTS

| 6,553,431 | B1 | 4/2003 | Yamamoto | |
|---|---|---|---|---|
| 7,030,890 | B1 * | 4/2006 | Jouet et al. | 345/619 |
| 7,685,532 | B2 * | 3/2010 | Yoshimi et al. | 715/773 |
| 7,827,591 | B2 * | 11/2010 | Sharma et al. | 726/2 |
| 7,957,021 | B2 * | 6/2011 | Moroi | 358/1.15 |

(Continued)

FOREIGN PATENT DOCUMENTS

| CN | 1854914 | 11/2006 |
|---|---|---|
| CN | 1877514 | 12/2006 |

(Continued)

OTHER PUBLICATIONS

U.S. Appl. No. 12/863,308, filed Nov. 1, 2010.

(Continued)

*Primary Examiner* — William Titcomb
(74) *Attorney, Agent, or Firm* — Fitzpatrick, Cella, Harper & Scinto

(57) ABSTRACT

This invention provides an information processing apparatus which obtains screen information via a network from an external apparatus and displays an operation screen based on information registered in association with a specific application, when a predetermined key is operated while the specific application is in progress. To accomplish this, an MFP obtains screen information from a Web server based on URL information registered in association with a Web application, and displays the initial screen of the Web application, when a reset key is pressed while the Web application is in progress.

8 Claims, 16 Drawing Sheets

(56) References Cited

U.S. PATENT DOCUMENTS

| | | | | |
|---|---|---|---|---|
| 8,570,571 | B2* | 10/2013 | Moroi | 358/1.15 |
| 2002/0147741 | A1* | 10/2002 | Hashimoto | 707/500 |
| 2004/0119751 | A1* | 6/2004 | Yoshimi et al. | 345/773 |
| 2004/0140986 | A1* | 7/2004 | Boldon | 345/700 |
| 2005/0210118 | A1* | 9/2005 | Hickman et al. | 709/208 |
| 2006/0077423 | A1 | 4/2006 | Mathieson | |
| 2006/0090128 | A1* | 4/2006 | Reddy et al. | 715/513 |
| 2006/0101343 | A1 | 5/2006 | Machida | |
| 2006/0235943 | A1 | 10/2006 | Nakai | |
| 2008/0120394 | A1* | 5/2008 | Yokoyama et al. | 709/217 |
| 2008/0150952 | A1 | 6/2008 | Koarai | |
| 2008/0168106 | A1* | 7/2008 | Freedman | 707/201 |
| 2008/0186286 | A1 | 8/2008 | Yoshimi | |
| 2008/0195590 | A1* | 8/2008 | Nakamura et al. | 707/3 |
| 2008/0263470 | A1* | 10/2008 | Murman et al. | 715/772 |
| 2008/0263546 | A1 | 10/2008 | Yoshimura et al. | |
| 2009/0021780 | A1 | 1/2009 | Sato | |
| 2009/0080013 | A1 | 3/2009 | Sato | |
| 2009/0271499 | A1* | 10/2009 | Reisman | 709/219 |
| 2009/0327905 | A1* | 12/2009 | Mascarenhas et al. | 715/738 |
| 2013/0301830 | A1* | 11/2013 | Bar-El et al. | 380/210 |

FOREIGN PATENT DOCUMENTS

| | | |
|---|---|---|
| CN | 101237499 | 8/2008 |
| JP | 2006-127503 | 5/2006 |

OTHER PUBLICATIONS

European Search Report dated Jan. 31, 2011 issued in European Application No. 10182474.6.
Chinese Office Action dated Dec. 18, 2012 issued during prosecution of related Chinese application No. 201010501866.2 (whole English-language translation included).
Chinese Office Action issued Aug. 7, 2013 in corresponding Chinese Application No. 201010501866.2 (with whole English Translation).
Korean Office Action dated Aug. 30, 2013 issued during prosecution of related Korean application No. 10-2010-0094044.

* cited by examiner

| FUNCTION NAME | APPLICATION ID | FUNCTION ID | |
|---|---|---|---|
| Scan | Browser | 1 | ~1002 |
| Print | Browser | 2 | ~1003 |
| Browser | Browser | 3 | ~1004 |
| Fax | Browser | 4 | ~1005 |
| Copy | Copy | 5 | ~1006 |

(header row marker: ~1001)

FIG. 11

| FUNCTION ID | URL | STORAGE FLAG | SESSION RESET FLAG |
|---|---|---|---|
| 1 | http://example.com/app1/scan | 1 | 0 |
| 2 | http://example.com/app1/print | 1 | 0 |
| 3 | <ACCESS WEB PAGE SETTING> | 0 | 1 |
| 4 | http://example.com/app1/fax | 1 | 0 |

1101

1102
1103
1104
1105

F I G. 12B
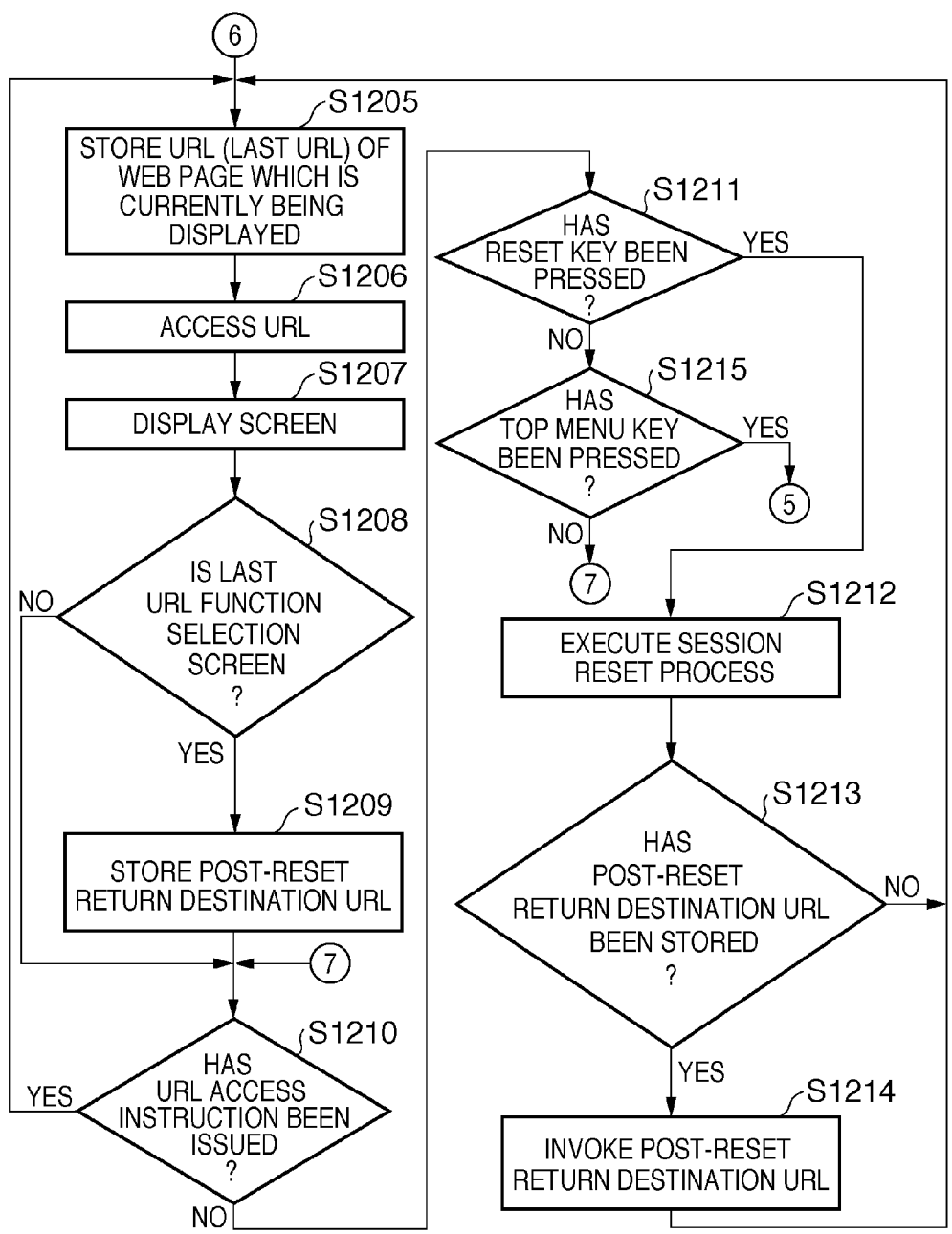

F I G. 13
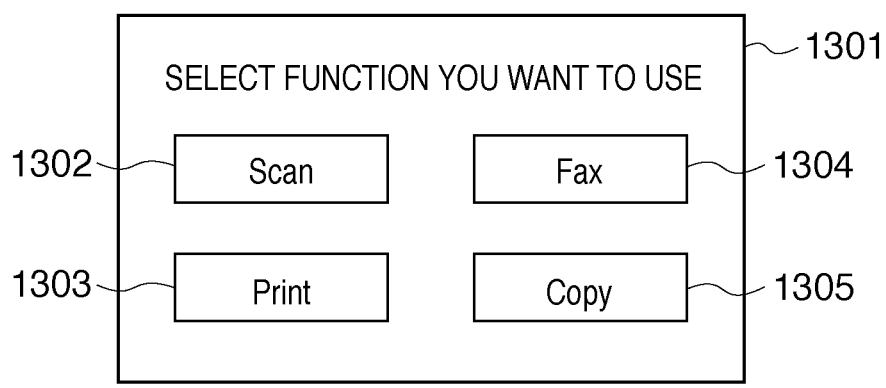
F I G. 14
| FUNCTION SELECTION SCREEN NAME | URL |
|---|---|
| COMMON MENU | http://example.com/menu/public |
| PRIVATE MENU | http://example.com/menu/personal |

FIG. 16

| URL | STORAGE FLAG | SESSION RESET FLAG |
|---|---|---|
| http://example.com/app1/scan | 1 | 0 |
| http://example.com/app1/print | 1 | 0 |
| http://example.com/app1/fax | 0 | 1 |

INFORMATION PROCESSING APPARATUS, CONTROL METHOD THEREFOR, AND STORAGE MEDIUM

BACKGROUND OF THE INVENTION

1. Field of the Invention

The present invention relates to an information processing apparatus, control method therefor, and storage medium which can use a plurality of applications.

2. Description of the Related Art

It is a known practice to connect an information processing apparatus such as a PC to a Web server, and display an operation screen provided by the Web server on a Web browser preinstalled on the information processing apparatus. In this case, the Web browser on the information processing apparatus requests an operation screen of the Web server. On the other hand, a Web application on the Web server transmits an HTML file for displaying the operation screen on the Web browser to the information processing apparatus in response to the request from it. The Web browser on the information processing apparatus analyzes the received HTML file, and displays an operation screen based on the description of the received HTML file. After that, when the user inputs an instruction via the operation screen displayed on the Web browser, the Web browser notifies the Web server of the input instruction. In response to the notification, the Web application on the Web server executes a process in accordance with the input instruction.

In recent years, some MFPs (Multi-Function Peripherals) including scanners or printers have Web browsers as mentioned above. Japanese Patent Laid-Open No. 2006-127503, for example, proposes a technique of providing, by a Web server, an operation screen for inputting an instruction to use each function of an MFP. More specifically, when the user inputs an instruction via an operation screen displayed on a Web browser on an MFP, a Web server is notified of the user instruction. In response to the notification, the Web server requests the MFP to execute various types of processes, in accordance with the contents of the instruction input by the user. In response to this request, the MFP executes the requested processes. This obviates the need to store all menu data for operating the MFP in the MFP, and makes it possible to easily change the menu data on the Web server.

Unfortunately, the conventional techniques pose the following problems. Some information processing apparatuses such as an MFP as mentioned above are provided with the screens of some applications by a Web server, and read out and execute programs stored in the MFP as for other applications. In the following description, an application provided by a Web server will be referred to as a "Web application", and an application executed based on information stored in an MFP in advance will be referred to as a "native application". For example, some MFPs are provided with a copy function as a native application, and a scan function as a Web application. The same operability is desirably provided even to such an MFP without requiring the user to be aware of which application is a Web application or a native application.

However, the operability of a predetermined key (e.g., a reset key that is a hardware key) built in an MFP cannot be the same between a native application and a Web application. This is because a Web application can handle an input via, for example, a button in an operation screen displayed on a Web browser, but cannot handle an input via a hardware key. For example, if a reset key that is a hardware key built in an MFP is pressed during the operation of a copy function provided as a native application, a reset process of the copy function is executed, and the initial screen of the copy function is displayed. In contrast, if the reset key is pressed during the operation of a scan function provided as a Web application, a reset process of the Web browser is enabled, and a web page set on the Web browser is displayed. Therefore, the scan function has an operability different from that of the copy function, so such an MFP is hard to use for a user who anticipates that a reset process of the scan function will be executed by pressing the reset key, and the initial screen of the scan function will be displayed.

SUMMARY OF THE INVENTION

The present invention enables realization of a mechanism which obtains screen information via a network from an external apparatus and displays an operation screen based on information registered in association with a specific application, when a predetermined key is operated while the specific application is in progress.

One aspect of the present invention provides an information processing apparatus being capable of using a plurality of applications, comprising: a registration unit that registers information, which indicates an operation screen to be displayed when a predetermined key is operated, in association with a specific application included in the plurality of applications; an obtaining unit that obtains screen information via a network from an external apparatus based on the information registered in association with the specific application, when the predetermined key is operated while the specific application is in progress; and a display unit that displays the operation screen based on the screen information obtained by the obtaining unit.

Another aspect of the present invention provides an information processing apparatus being capable of using a plurality of applications including a first application preinstalled on an external apparatus, and a second application preinstalled on the apparatus itself, comprising: a registration unit that registers URL information, which indicates an initial screen of the first application to be displayed when a reset key is operated, in association with the first application; and a display unit that displays the initial screen of the first application based on screen information obtained via a network from the external apparatus based on the URL information registered in association with the first application, when the reset key is operated while the first application is in progress, and displays an initial screen of the second application based on screen information, stored in the information processing apparatus in advance, when the reset key is operated while the second application is in progress.

Still another aspect of the present invention provides a control method for an information processing apparatus being capable of using a plurality of applications, comprising: registering information, which indicates an operation screen to be displayed when a predetermined key is operated, in association with a specific application included in the plurality of applications; obtaining screen information via a network from an external apparatus based on the information registered in association with the specific application, when the predetermined key is operated while the specific application is in progress; and displaying the operation screen based on the screen information obtained.

Yet still another aspect of the present invention provides a control method for an information processing apparatus being capable of using a plurality of applications including a first application preinstalled on an external apparatus, and a second application preinstalled on the apparatus itself, comprising: registering URL information, which indicates an initial screen of the first application to be displayed when a reset key is operated, in association with the first application; and displaying the initial screen of the first application based on screen information obtained via a network from the external apparatus based on the URL information registered in association with the first application, when the reset key is operated while the first application is in progress, and displaying an initial screen of the second application based on screen information, stored in the information processing apparatus in advance, when the reset key is operated while the second application is in progress.

Still yet another aspect of the present invention provides a non-transitory computer-readable storage medium storing a computer program for causing a computer to execute a control method for an information processing apparatus being capable of using a plurality of applications, the method comprising: registering information, which indicates an operation screen to be displayed when a predetermined key is operated, in association with a specific application included in the plurality of applications; obtaining screen information via a network from an external apparatus based on the information registered in association with the specific application, when the predetermined key is operated while the specific application is in progress; and displaying the operation screen based on the screen information obtained.

Yet still another aspect of the present invention provides a non-transitory computer-readable storage medium storing a computer program for causing a computer to execute a control method for an information processing apparatus being capable of using a plurality of applications, the method comprising: registering URL information, which indicates an initial screen of the first application to be displayed when a reset key is operated, in association with the first application; and displaying the initial screen of the first application based on screen information obtained via a network from the external apparatus based on the URL information registered in association with the first application, when the reset key is operated while the first application is in progress, and displaying an initial screen of the second application based on screen information, stored in the information processing apparatus in advance, when the reset key is operated while the second application is in progress.

Further features of the present invention will become apparent from the following description of exemplary embodiments with reference to the attached drawings.

BRIEF DESCRIPTION OF THE DRAWINGS

FIG. 11 is a table showing an application URL table stored in the table 563 according to the first embodiment;

FIGS. 12A and 12B are a flowchart showing the procedure of a process when a reset key is pressed according to the second embodiment;

FIG. 13 is a view showing a function selection screen provided by a Web application 510 according to the second embodiment;

FIG. 14 is a table showing a function selection screen URL table stored in a table 563 according to the second embodiment;

FIG. 16 is a table showing an application management table stored in a table 563 according to the third embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Hardware Configuration of Information Processing System>

Figure 1:
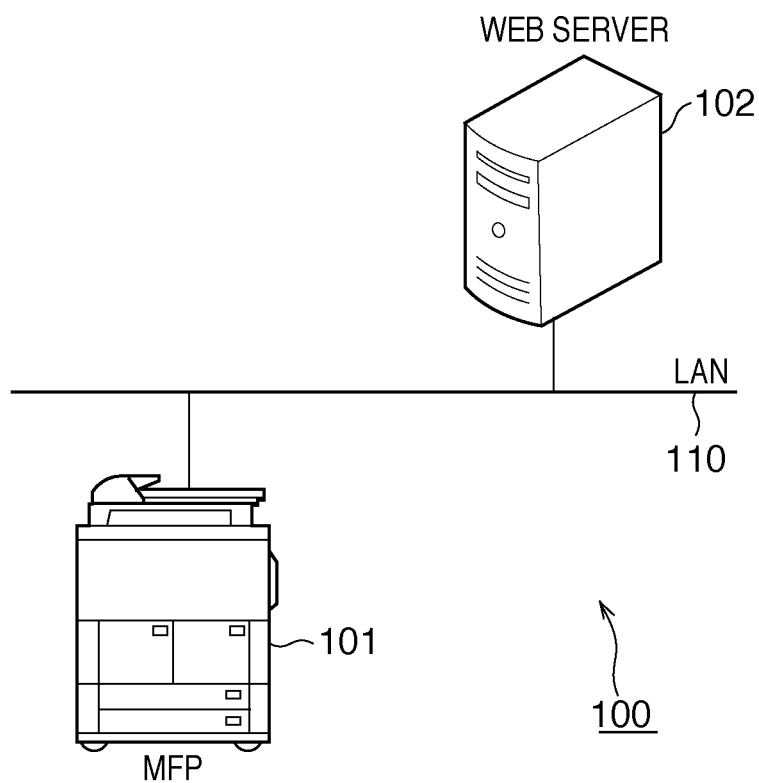
FIG. 1 is a diagram showing an example of the arrangement of an information processing system 100 according to the first embodiment.

The hardware configuration of an information processing system according to the first embodiment will be described first with reference to FIG. 1. An information processing system 100 includes an MFP 101 having a Web browser function, and a Web server 102 having a Web server function. The MFP 101 and Web server 102 are communicably connected to each other via a LAN 110. Note that the MFP 101 is an example of an information processing apparatus, and the Web server 102 is an example of an external apparatus. The MFP 101 can use a Web application (first application) preinstalled on the Web server 102, and a native application (an internal application that is a second application) preinstalled on the MFP 101 (on the information processing apparatus). The MFP 101 includes a display unit and operation unit. The display unit displays the display screen of the Web application or of the native application. The operation unit includes a plurality of hardware keys (to be simply referred to as hard keys hereinafter). Note that the display unit is a touch panel LCD, which displays software keys (to be simply referred to as soft keys hereinafter) and can receive an input via the software keys.

According to this embodiment, when a predetermined key built into the MFP 101 serving as an information processing apparatus is pressed, an identical operation can be performed regardless of whether the Web application or the native application is in progress. A reset key that is a hardware key will exemplify the predetermined key in the following embodiment. However, the present invention is not limited to this, and a software key for executing a reset process of the application in progress, for example, may be adopted as the predetermined key. In this case, a display region to display the software key, for example, must be set separately from that for the Web application or native application on the display unit.

<Control Configuration of Information Processing System>

Figure 2:
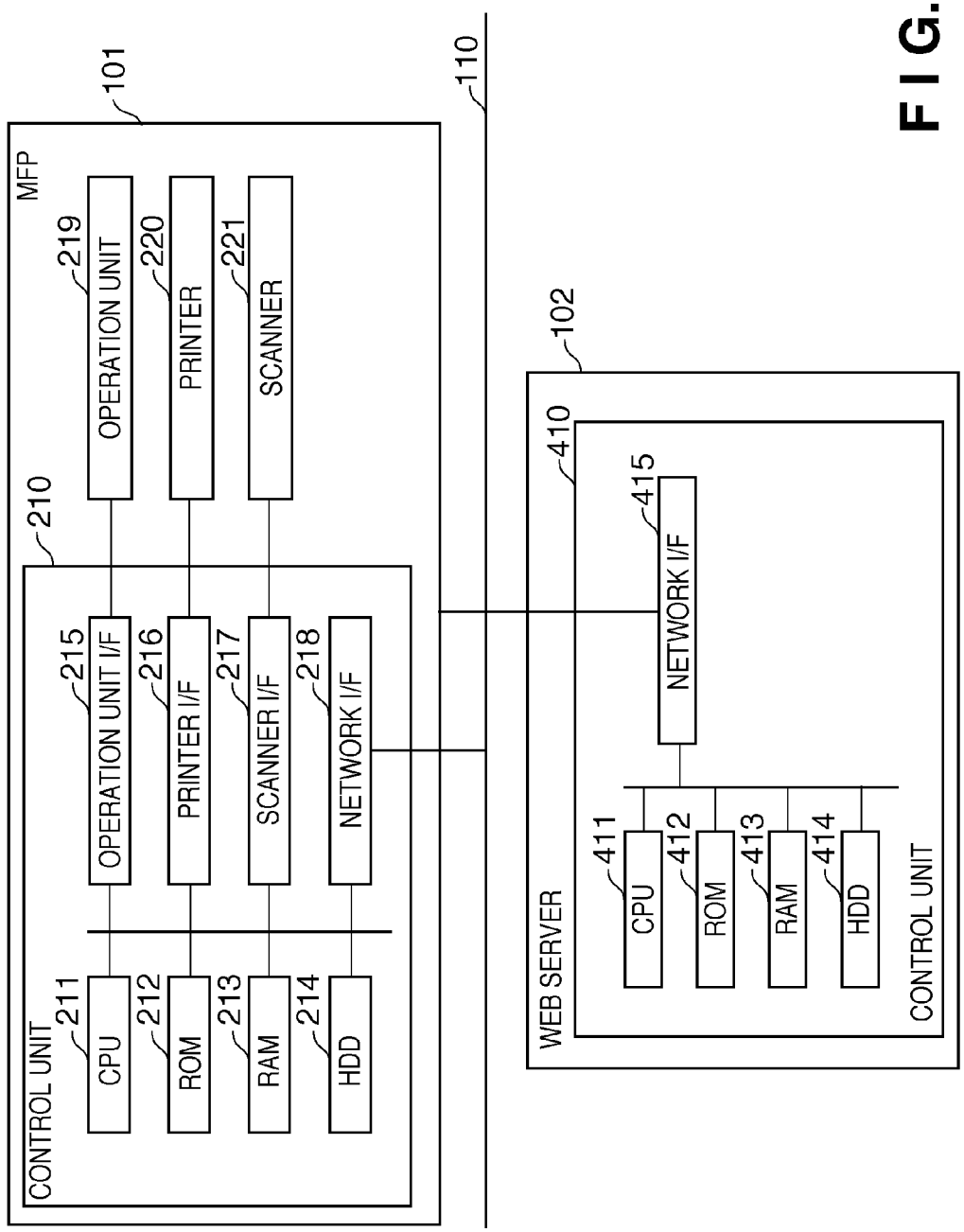
FIG. 2 is a block diagram showing the control configuration of the information processing system 100 according to the first embodiment.

The control configuration of the MFP 101 and the Web server 102 will be described next with reference to FIG. 2. A control unit 210 including a CPU 211 systematically controls the MFP 101. The CPU 211 reads out a control program stored in a ROM 212, and executes various types of control processes such as reading control and transmission control. A RAM 213 is used as temporary storage areas such as a main memory and work area of the CPU 211. An HDD 214 stores image data, various types of programs, or various types of information tables (to be described later). An operation unit I/F 215 connects an operation unit 219 and the control unit 210 to each other. The operation unit 219 includes, for example, a keyboard and a liquid crystal display unit having a touch panel function. The MFP 101 has a Web browser function (to be described later), and the Web browser on the MFP 101 analyzes an HTML file received from the Web server 102, and displays an operation screen based on the description of the received HTML file on the operation unit 219. The operation unit 219 includes an LCD display unit having a touch panel sheet adhered on an LCD. The LCD display unit displays a native function module (to be described later), an operation screen displayed on the Web browser, and software keys. When the key being displayed is pressed, the LCD display unit sends position information which indicates the pressed position to the CPU 211.

The operation unit 219 includes various types of hard keys such as a start key, a stop key, a reset key, a guide key, a top menu key, and numeric keys. The start key is used to instruct the start of an operation of reading a document image, and has an LED display portion of two colors: green and red at its central portion. The LED display portion of two colors indicates whether the start key is enabled, with different colors. The stop key is used to stop the operation in progress. The reset key is used to initialize settings. The guide key is used to display a method of using the MFP 101. The top menu key is used to display a top menu screen for selecting a function of the MFP 101. The numeric keys are used to input numeric values.

A printer I/F 216 connects a printer 220 and the control unit 210 to each other. Image data to be printed by the printer 220 is transferred from the control unit 210 to the printer 220 via the printer I/F 216, and printed on a printing medium by the printer 220. A scanner I/F 217 connects a scanner 221 and the control unit 210 to each other. The scanner 221 reads an image on a document to generate image data, and inputs the image data to the control unit 210 via the scanner I/F 217. A network I/F 218 connects the control unit 210 to the LAN 110. The network I/F 218 transmits image data or information to external apparatuses (e.g., the Web server 102) on the LAN 110, or receives various types of information from the external apparatuses on the LAN 110.

The Web server 102 includes a CPU 411 which systematically controls the Web server 102. The CPU 411 reads out a control program stored in a ROM 412, and executes various types of control processes. A RAM 413 is used as temporary storage areas such as a main memory and work area of the CPU 411. An HDD 414 stores image data, various types of programs, or various types of information tables. A network I/F 415 connects a control unit 410 to the LAN 110. The network I/F 415 exchanges various types of information with other apparatuses on the LAN 110.

<Functional Configuration of Information Processing System>

Figure 3:
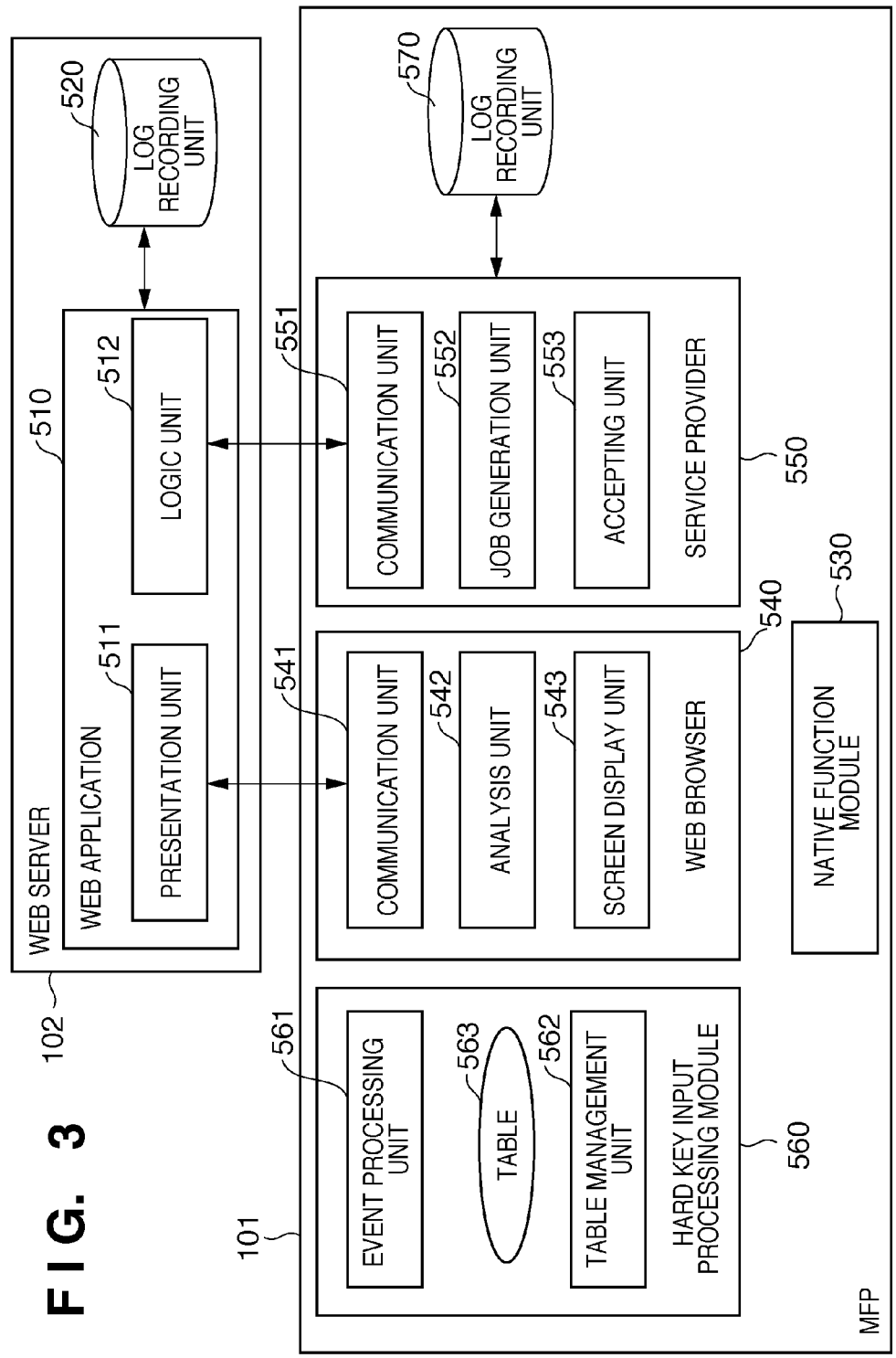
FIG. 3 is a block diagram showing the functional configuration of the information processing system 100 according to the first embodiment.

The functional configuration of the information processing system 100 will be described next with reference to FIG. 3. Each functional block shown in FIG. 3 is implemented by executing a control program using the CPU 211 or 411 of the MFP 101 or Web server 102, respectively. The MFP 101 includes a native function module 530, Web browser 540, service provider 550, hard key input processing module 560, and log recording unit 570. The native function module 530 means various types of native applications which are not provided by the Web server 102, but provided based on the programs stored in the MFP 101. The native applications include, for example, an application for executing a print process by the printer 220 of the MFP 101, that for executing a reading process by the scanner 221 of the MFP 101, and that for executing a transmission process via the network I/F 218 of the MFP 101. The native function module 530 also includes, for example, a module which performs the overall setting of the MFP 101, and that which switches from one application to another.

The Web browser 540 includes a communication unit 541, analysis unit 542, and screen display unit 543. The communication unit 541 communicates with a presentation unit 511 of the Web application 510 in accordance with an HTTP protocol. More specifically, the communication unit 541 requests an operation screen to be displayed on the Web browser 540 of the Web application 510, or notifies the Web application 510 of a user instruction input via the operation screen displayed on the Web browser 540. Also, when the communication unit 541 receives a notification including URL information from the hard key input processing module 560 (to be described later), it requests the URL designated in the notification of the Web application 510. In other words, the communication unit 541 requests URL information which can specify an operation screen. The analysis unit 542 analyzes an HTML file received from the Web application 510. The HTML file contains a description (screen information) which indicates the contents of an operation screen to be displayed on the Web browser 540. The screen display unit 543 displays the operation screen on the operation unit 219 based on the analysis result obtained by the analysis unit 542. A screen displayed based on screen information (e.g., an HTML file) received from the Web server 102 as in this case will be referred to as a Web browser screen hereinafter.

The Web server 102 includes a Web application 510 and log recording unit 520. The Web application 510 also includes the presentation unit 511 and a logic unit 512. The presentation unit 511 communicates with the communication unit 541, and transmits an operation screen to be displayed on the Web browser 540 of the MFP 101 to the MFP 101 in response to a request from the MFP 101. Also, the presentation unit 511 receives a user instruction, input via the operation screen displayed on the Web browser 540 of the MFP 101, from the MFP 101.

In response to the user instruction, the Web application 510 executes various types of processes in accordance with the instruction contents, and requests the MFP 101 to transmit an operation notification which indicates that a hard key of the MFP 101 has been operated. Such a request will be referred to as a hard key input notification request hereinafter. More specifically, when a hard key of the MFP 101 is pressed, the Web browser 540 of the MFP 101 designates a URL to be requested. Also, the Web application 510 requests the MFP 101 to execute a process in accordance with the instruction contents. For example, the Web application 510 requests the MFP 101 to execute a print process by the printer 220 of the MFP 101, a reading process by the scanner 221 of the MFP 101, or a transmission process via the network I/F 218 of the MFP 101.

In this manner, when a predetermined hard key is operated while a predetermined operation screen is displayed, and the MFP 101 is to be requested to issue an operation notification which indicates to that effect or to execute a process, the logic unit 512 communicates with the communication unit 551 of the service provider 550. The result of the process executed by the MFP 101 is recorded in the log recording unit 520. Note that the log recording unit 520 also records the result of an authentication process executed by the Web server 102.

The service provider 550 of the MFP 101 includes a communication unit 551, job generation unit 552, and accepting unit 553. The communication unit 551 accepts a process request from the logic unit 512 of the Web application 510. If the communication unit 551 accepts the hard key input notification (operation notification) request from the Web application 510, the accepting unit 553 notifies the hard key input processing module 560 of the accepted information. If the communication unit 551 is requested to execute a process from the Web application 510, the job generation unit 552 generates and executes a job for executing the requested process. The job execution result is recorded in the log recording unit 570. Note that the log recording unit 570 also keeps, for example, a log of communication with the Web server 102.

The hard key input processing module 560 includes a table 563, table management unit 562, and event processing unit 561. The table management unit 562 receives the notification from the accepting unit 553 of the service provider 550, and registers the received information in the table 563. The table 563 manages a URL to be requested by the Web browser 540 upon detecting pressing of each hard key. Note that the table 563 is stored in a memory unit of the MFP 101, such as the RAM 213 or HDD 214. Note also that the pressed key is limited to hard keys herein. However, the present invention is also applicable to soft keys imparted with the functions of the hard keys. In this case, the hard key input processing module 560 must adapt to the above-mentioned soft keys.

The event processing unit 561 receives the hard key input notification from the operation unit 219, and notifies the Web browser 540 or native function module 530 of the received information by looking up the table 563. For example, for a hard key to which a URL is assigned in the table 563, the event processing unit 561 notifies the Web browser 540 of the URL. In contrast, for a hard key to which no URL is assigned in the table 563, the event processing unit 561 notifies the native function module 530 of the hard key input. The native function module 530 executes a predetermined process corresponding to the hard key, the URL or input of which is sent to the MFP 101. Note that a part or the whole of the hard key input processing module 560 may be configured as a submodule of the Web browser 540, service provider 550, or native function module 530.

<Operation of Web Browser>

Figure 4:
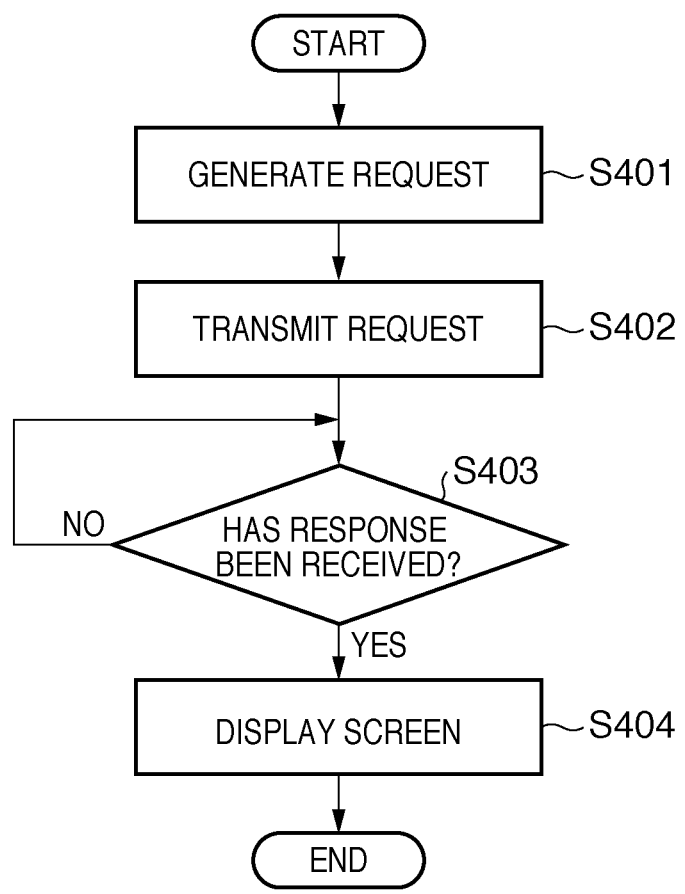
FIG. 4 is a flowchart showing the procedure of a process of requesting an operation screen to be displayed on an MFP 101 according to the first embodiment.

A process of requesting an operation screen by the Web browser 540 will be described next with reference to FIG. 4. The process to be described hereinafter is executed by the Web browser 540 by executing a control program using the CPU 211 of the MFP 101. Note that reference numerals prefixed with S denote step numbers in respective processes. First, in step 5401, the Web browser 540 generates a request for requesting an operation screen, to be displayed on the display unit of the MFP 101, of the Web server 102. This request may be for a URL set in advance as, for example, the web page of the Web browser 540, that is input to the URL input field on the Web browser 540, or that of a link selected by the user via the screen displayed on the Web browser 540. In step 5402, the Web browser 540 transmits the generated request to the Web server 102.

In step S403, in response to the transmitted request, the Web browser 540 determines whether screen information of the operation screen has been transmitted from the Web server 102. In practice, an HTML file, for example, is transmitted from the Web server 102 as screen information for displaying the operation screen of the Web browser 540. If the Web browser 540 has received the screen information of the operation screen, the process advances to step S404; otherwise, the process waits until the Web browser 540 receives the screen information. In step S404, the Web browser 540 displays the screen on the display unit in accordance with the description of the received HTML file.

<Operation of Web Application>

Figure 5:
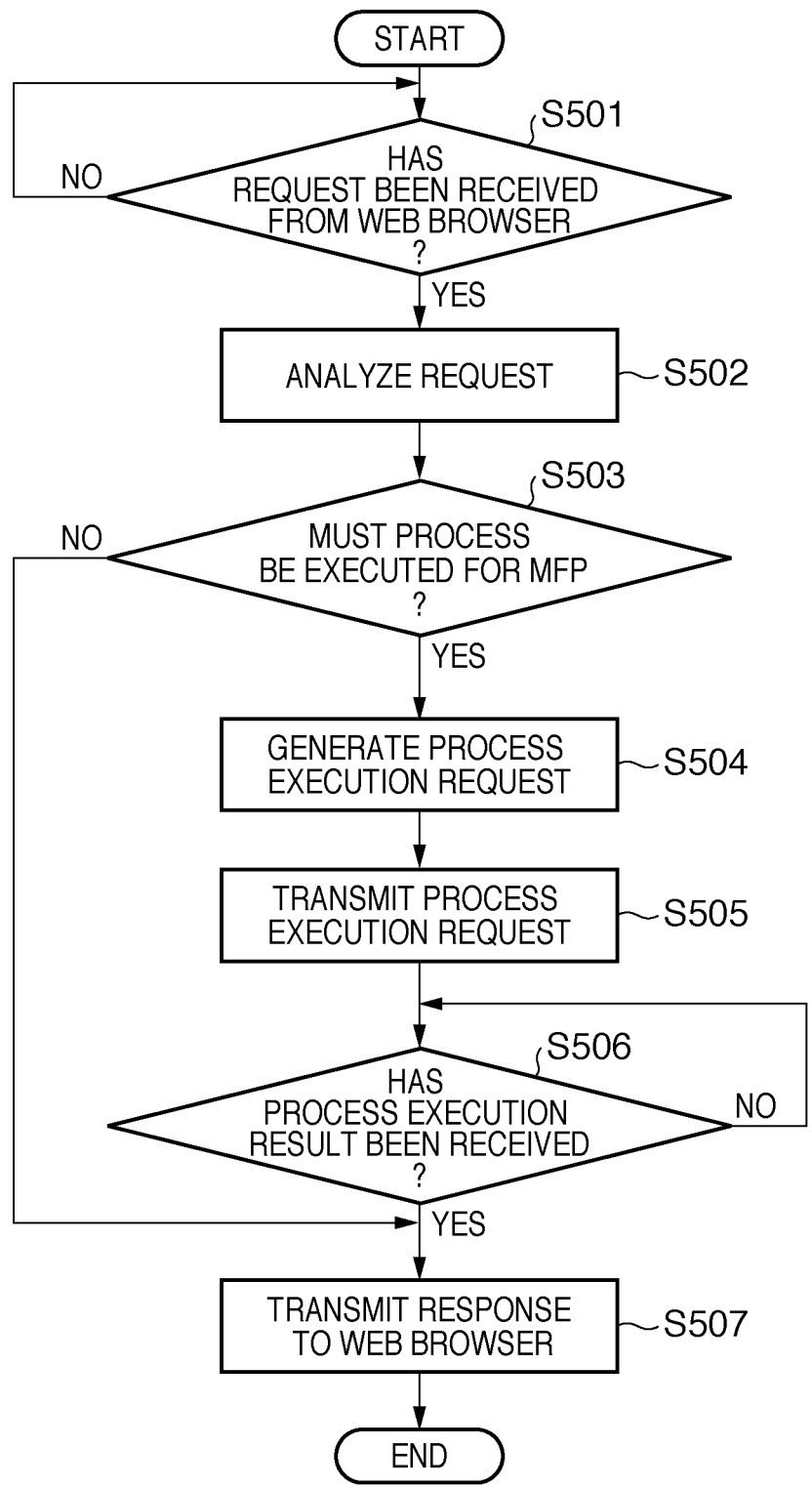
FIG. 5 is a flowchart showing the procedure of a process of responding to the request for the operation screen by a Web application 510 according to the first embodiment.

A process of responding to the request from the Web browser 540 by the Web server 102 will be described next with reference to FIG. 5. The process to be described hereinafter is implemented by executing a control program using the CPU 411 of the Web server 102. In step S501, the Web application 510 determines whether a request for an operation screen has been received from the Web browser 540. If the request has been received, the process advances to step S502; otherwise, the process waits until the request is received. Upon receiving the request, the Web application 510 analyzes the received request in step S502. Upon analyzing the request, the Web application 510 determines in step S503 whether a process must be executed for the MFP 101. If the process must be executed for the MFP 101, the process advances to step S504; otherwise, the process advances to step S507.

The Web application 510 generates a process execution request for the MFP 101 in step S504, and transmits the process execution request to the MFP 101 in step S505. In step S506, the Web application 510 determines whether the processing result of the process execution request has been received from the MFP 101. If the processing result has been received, the process advances to step S507; otherwise, the process waits until the process execution result is received. In step S507, the Web application 510 transmits a response to the Web browser 540. In practice, the response uses, for example, an HTML file for displaying the operation screen on the Web browser 540 based on the request from the Web browser 540.

<Operation of Service Provider>

Figure 6:
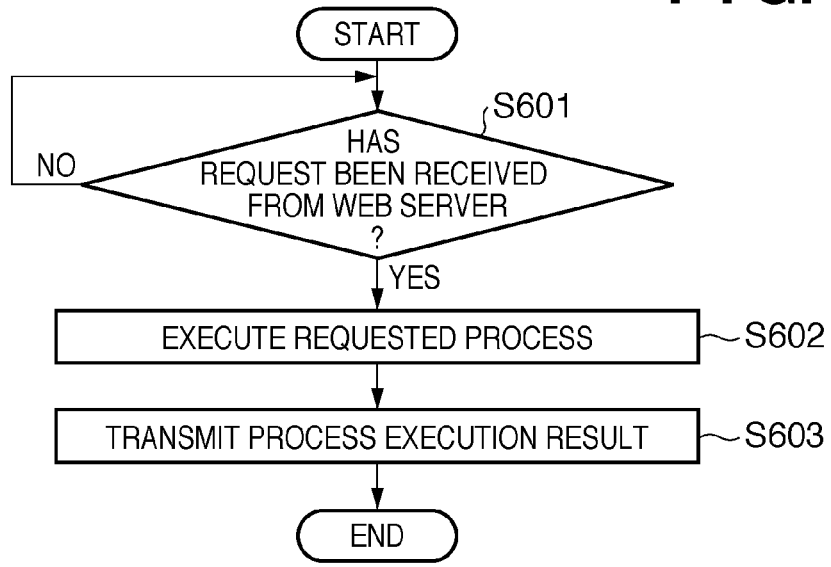
FIG. 6 is a flowchart showing the procedure of the process of a service provider according to the first embodiment.

The process of the service provider of the MFP 101 will be described next with reference to FIG. 6. The process to be described hereinafter is executed by the service provider 550 by executing a control program using the CPU 211 of the MFP 101. In step S601, the service provider 550 determines whether a request has been received from the Web server 102. If a request has been received from the Web server 102, the process advances to step S602; otherwise, the process waits until the request is received. In step S602, the service provider 550 executes a process in accordance with the request contents, and the process advances to step S603. More specifically, the job generation unit 552 generates and executes a job for executing the requested process. In step S603, the service provider 550 transmits the process execution result to the Web server 102.

<Process Associated with Pressing of a Hard Key>

Figure 7:
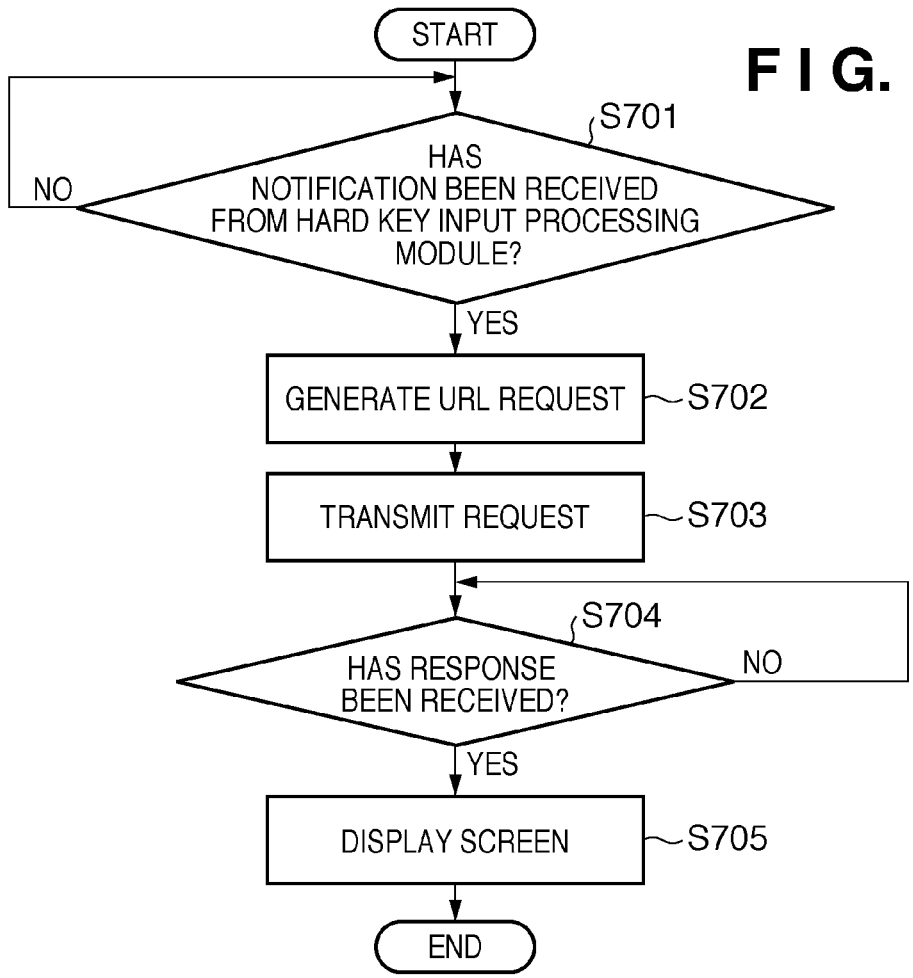
FIG. 7 is a flowchart showing the procedure of the process of a Web browser 540 when a hard key is pressed according to the first embodiment.

The operation of the Web browser 540 when a hard key of the MFP 101 is pressed will be described next with reference to FIG. 7. The process to be described hereinafter is executed by executing a control program using the CPU 211 of the MFP 101. Although a process associated with pressing of a hard key will be explained in this embodiment, the present invention is not limited to this, and a soft key imparted with the function of the hard key to be described hereinafter may be adopted.

In step S701, the Web browser 540 determines whether a notification has been received from the hard key input processing module 560. If the notification has been received, the process advances to step S702; otherwise, the process waits until the notification is received. The Web browser 540 generates an HTTP request for requesting a URL stored in the table 563 in step S702, and transmits the generated request to the Web server 102 in step S703. In step S704, the Web browser 540 determines whether a response to the request has been received from the Web server 102. If the response has been received, the process advances to step S705; otherwise, the process waits until the response is received. In practice, the response uses an HTML file. In step S705, the Web browser 540 displays the screen on the display unit in accordance with the description of the received HTML file.

<Operation when the Reset Key is Pressed>

Figure 8A:
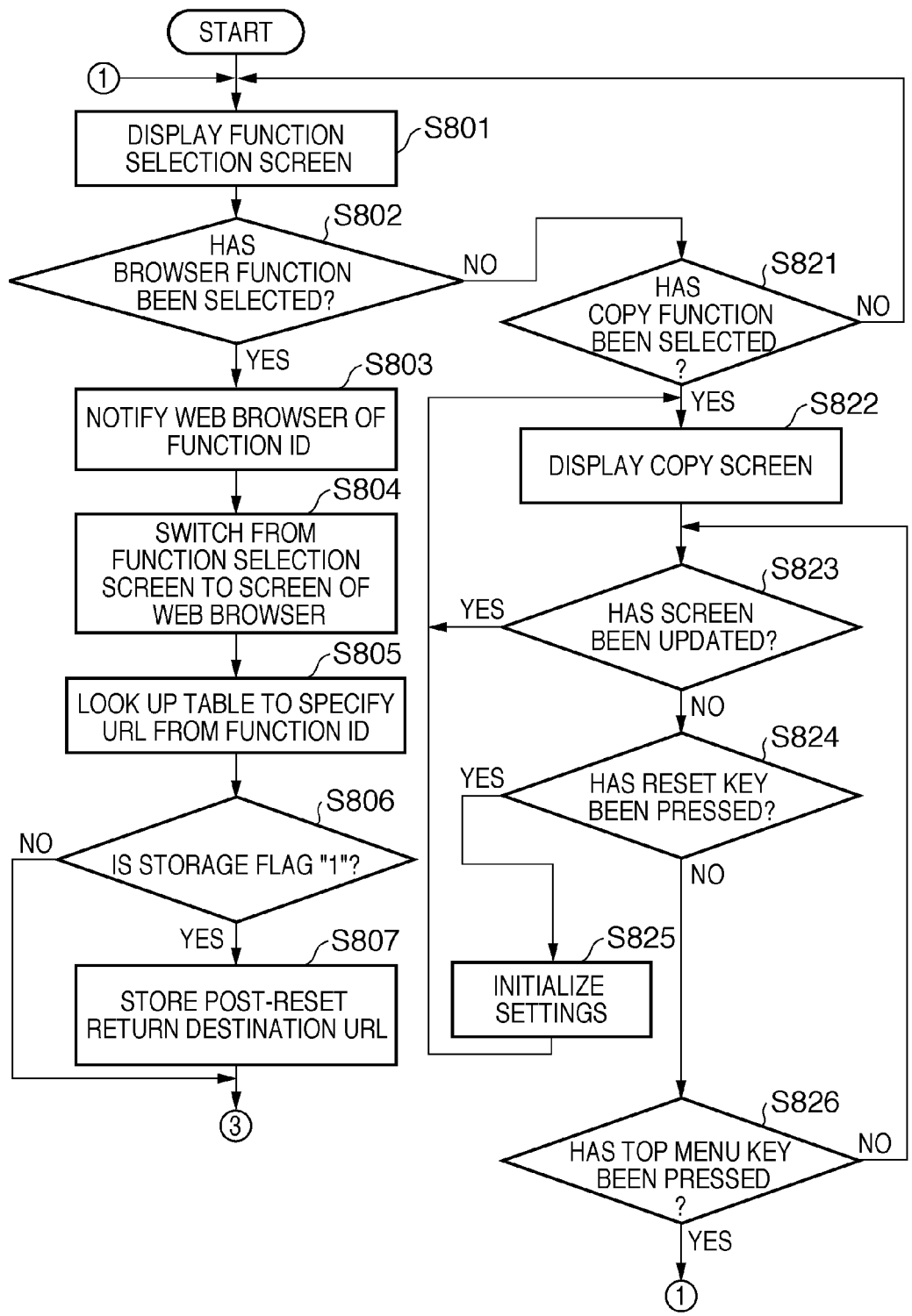
FIGS. 8A and 8B are a flowchart showing the procedure of a process when a reset key is pressed according to the first embodiment.
Figure 8B:
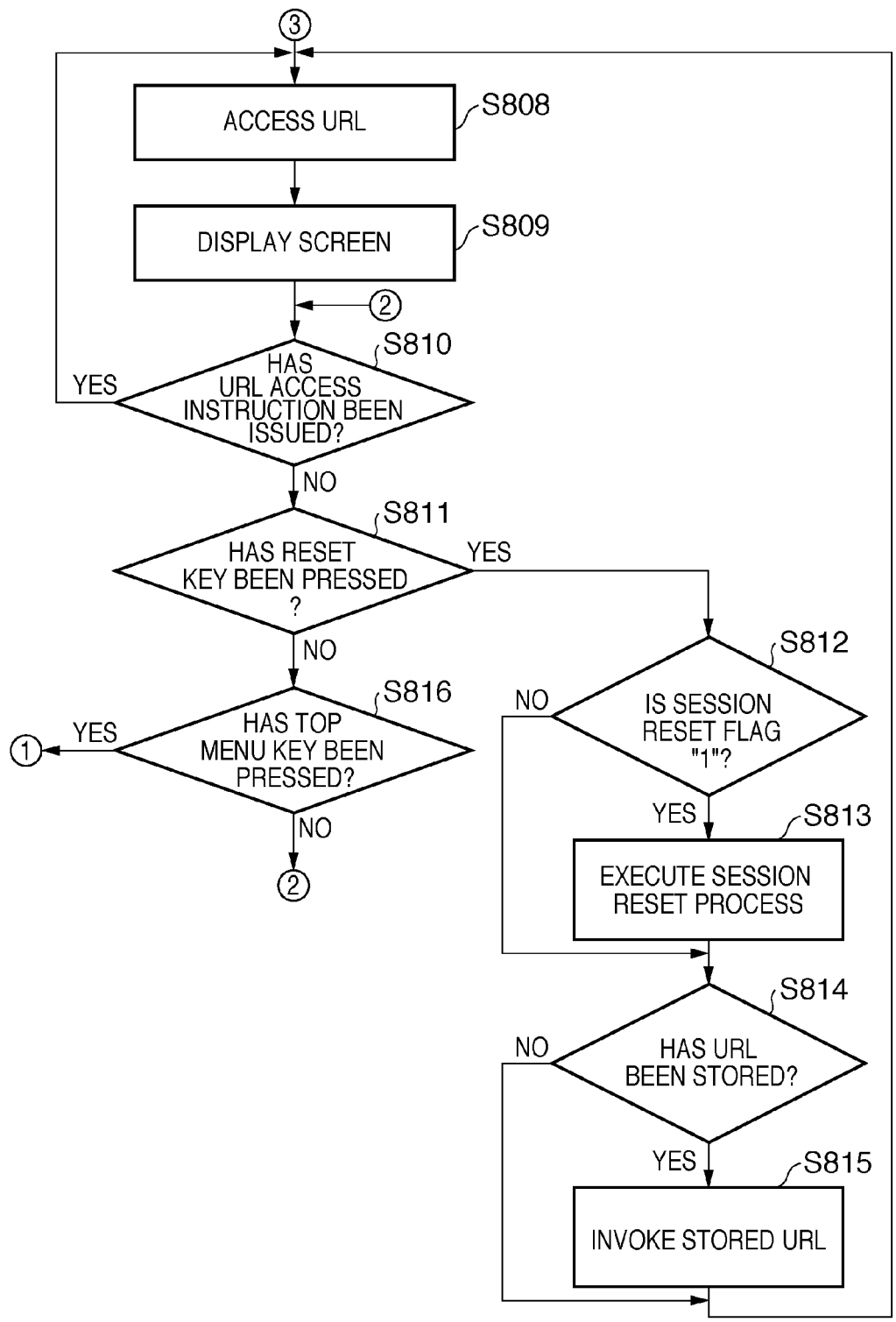

An operation when a reset key is pressed during the operation of the Web browser 540 will be described next with reference to FIGS. 8A and 8B. The process to be described hereinafter is implemented by executing a control program using the CPU 211 of the MFP 101. In step S801, the native function module 530 displays a function selection screen, for using a function of the Web application 510, as the display screen of a native application. Reference numeral 901 in FIG. 9 denotes a function selection screen. In step S802, the native function module 530 determines whether the user has selected a browser function via the function selection screen 901. If the user has selected the browser function, the process advances to step S803; otherwise, the process advances to step S821. On the function selection screen 901, a scan function (Scan) 902, print function (Print) 903, browser function (Browser) 904, and Fax function (Fax) 905 are implemented using the Web browser 540. A copy function (Copy) 906 is implemented by a native application which does not use the Web browser 540.

In step S803, the native function module 530 notifies the Web browser 540 of a function ID (identification information) that is an ID uniquely assigned to the function selected via the function selection screen 901. Reference numeral 1001 in FIG. 10 denotes a function ID table describing function IDs. In step S804, the native function module 530 switches from the function selection screen 901 serving as a native display function to the screen of the Web browser 540.

In step S805, the Web browser 540 looks up the table 563 to specify a URL associated with the function ID sent in step S803. Reference numeral 1101 in FIG. 11 denotes a table which associates function IDs and URLs (transition destinations). In step S806, the Web browser 540 looks up the table 563 to determine whether a storage flag (storage information) associated with the above-mentioned function ID is "1". If the storage flag is "1", the process advances to step S807; and if the storage flag is "0", the process advances to step S808. Note that the storage flag indicates whether the browser temporarily stores the URL in the RAM 213. The flag shows two statuses "1" and "0": the URL is temporarily stored for "1" and is not temporarily stored for "0".

In step S807, the Web browser 540 stores, in the RAM 213, the URL specified by the look-up in step S805, and the process advances to step S808. In step S808, the Web browser 540 accesses the URL specified by the look-up in step S805, and the process advances to step S809. In step S809, the Web browser 540 displays the screen. The Web browser 540 then accesses the Web server 102 to use the function of the Web application 510. The screen displayed at this time is the initial screen of the function of the Web application 510.

In step S810, the Web browser 540 determines whether a URL access instruction has been received upon the user's screen operation. If the URL access instruction has been received, the process returns to step S808; otherwise, the process advances to step S811. In step S811, the Web browser 540 determines whether the reset key that is a hard key built in the operation unit 219 of the MFP 101 has been pressed. If the reset key has been pressed, the process advances to step S812; otherwise, the process advances to step S816. In step S816, the Web browser 540 determines whether a link (top menu key) on the function selection screen 901 has been pressed. If the link has been pressed, the process returns to step S801; otherwise, the process returns to step S810.

If it is determined in step S811 that the reset key has been pressed, in step S812 the Web browser 540 looks up the table 563 to determine whether a session reset flag is "1". If the session reset flag is "1", the process advances to step S813. In step S813, the Web browser 540 executes a session reset process as an initialization process, and the process advances to step S814. In contrast, if the session reset flag is "0", the process advances to step S814. The session reset process will be described later.

In step S814, the Web browser 540 determines whether the URL has been stored in the RAM 213. If the URL has been stored, the process advances to step S815. In step S815, the Web browser 540 invokes the URL stored in step S807, and the process returns to step S808. With this process, the display screen can return to the initial screen of the function of the Web application 510 upon pressing the reset key that is a hard key. In contrast, if it is determined in step S814 that no URL has been stored in the RAM 213, the Web browser 540 looks up, for example, a web page setting, and the process returns to step S808. Note that the URL stored in the RAM 213 in step S807 may be cleared the moment the display screen returns to the function selection screen 901 in step S801 after the function of the Web application 510 is used, or may be cleared after the display screen returns to the function selection screen 901 in step S801 and another function is selected.

If it is determined in step S802 that the user has not selected the browser function, in step S821 the native function module 530 determines whether the user has selected the copy function. If the user has selected the copy function, the process advances to step S822. In step S822, the native function module 530 displays the initial screen of the copy function. Note that since the copy function is implemented by a native application, an operation screen (including the initial screen) associated with the copy function is displayed based on screen information stored in the MFP 101. In contrast, if it is determined in step S821 that the user has not selected the copy function, the process returns to step S801. In step S823, the native function module 530 determines whether the screen of the copy function has been updated in response to, for example, setting change corresponding to the user's operation input or a change in status of the apparatus or job. If the screen has been updated, the process advances to step S822. In step S822, the native function module 530 displays the copy screen again. In contrast, if the screen has not been updated, the process advances to step S824.

In step S824, the native function module 530 determines whether the reset key has been pressed. If the reset key has been pressed, the process advances to step S825. In step S825, the native function module 530 initializes the settings input by the user, such as the number of copies and the paper size, as an initialization process, and the process returns to step S822. In step S822, the native function module 530 displays the copy screen. In contrast, if the reset key has not been pressed, the process advances to step S826. In step S826, the native function module 530 determines whether the top menu key has been pressed. If the top menu key has been pressed, the process returns to step S801. In step S801, the native function module 530 displays the function selection screen 901. In contrast, if the top menu key has not been pressed, the process returns to step S823. In step S823, it is determined whether the screen of the copy function has been updated.

As described above, in this embodiment, the display screen can return to the initial screen irrespective of whether the reset key is pressed while the browser function is in progress or it is pressed when the copy function is in progress. In this manner, the information processing system and MFP 101 according to this embodiment can realize an identical operation regardless of the type of application in progress.

Note that if the reset key is pressed during the operation of the Web browser, whether to execute a session reset process can also be selected. This selection can be set for each URL button located on the top menu. This selection can also selectively be set for a general-purpose browser button. The session reset process means herein a process of disconnecting any remaining link to the Web server, if any, and deleting cookies registered by the Web server. A Web application generally combines a series of operations by one user as a single session, and distinguishes the series of operations from other operations by other users. The Web application stores information for identifying this session on the Web browser as a cookie. When the Web browser issues an HTTP request to a predetermined Web application or the Web server, cookie information (i.e., session identification information) stored during the requesting is included in the information regarding the HTTP request, so the Web application can identify and individually manage respective sessions. When session management is performed by sharing a common cookie among a plurality of Web applications, a session which has been authenticated in a given Web application need not be authenticated in other Web applications. This configuration is called single sign-on.

When a session reset process is set to be executed every time the reset key is pressed, the reset key pressing practically acts as a logoff instruction from the Web application. That is, a login process is necessary every time the user presses the reset key, depending on the configuration of a Web application. This configuration may provide good security, but does not provide convenience. The session reset process is not well suited to for providing the same operational feeling as the native functions of the apparatus.

<Function Selection Screen>

Figures 9, 10:
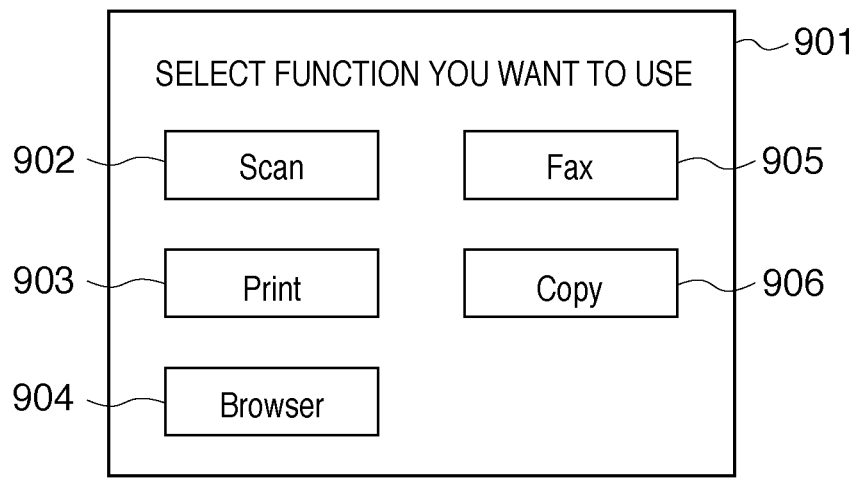
FIG. 9 is a view showing a function selection screen provided by a native function module 530 according to the first embodiment.
FIG. 10 is a table showing a function ID table stored in a table 563 according to the first embodiment.

The function selection screen 901 which is used to use a function of the Web application 510 and provided by the native function module 530 will be described next with reference to FIG. 9. The function selection screen 901 is displayed on the operation unit 219 of the MFP 101 to use a function of the Web application 510. The Scan 902 is a menu for using a scan function provided by the Web application 510. Similarly, the Fax 905 is a Fax function, and the Print 903 is a print function. On the other hand, the Copy 906 is a menu for using a copy function provided by the native function module 530. Also, the Browser 904 is not a function of the Web application 510 but a function for using the browser function of the Web browser 540.

<Function ID Table>

The function ID table 1001 stored in the table 563 will be described next with reference to FIG. 10. The function ID table 1001 is used to manage IDs associated with respective functions of the function selection screen 901. A row 1002 shows the ID of the Scan 902. Similarly, a row 1003 shows the ID of the Print 903, a row 1004 shows the ID of the Browser 904, a row 1005 shows the ID of the Fax 905, and a row 1006 shows the ID of the Copy 906. The function IDs are also associated with application IDs (type information). The application ID means the type of application used by each function. "Browser" is set for the rows 1002 to 1005 to use functions of the Web browser 540, whereas "Copy" is set for the row 1006 to use the copy function of the native function module 530.

<Application URL Table>

The application URL table 1101 stored in the table 563 will be described next with reference to FIG. 11. The application URL table 1101 is used to manage URLs associated with function IDs. For example, in a row 1102, function ID "1" is associated with URL http://example.com/app1/scan, so this URL is accessed if the Web browser 540 is notified of function ID "1" in step S803. A storage flag is also associated with function ID "1". The storage flag is set to "1" or "0", and the URL is stored in the process of step S807 for "1" and is not stored in this process for "0". In other words, the process in step S815 is executed if the storage flag is "1", and is not executed if the storage flag is "0". Furthermore, as shown in FIG. 11, each function ID may be stored in association with a session reset flag which indicates whether to execute a session reset process including a process of disconnecting a link to the Web server 102, and a process of deleting information for identifying a session of the link. The session reset flag is set to "1" or "0", and a session reset process is executed in the process of step S813 for "1" and is not executed in this process for "0". Session reset flags can be set for individual function IDs.

If the browser obtains a URL when a hard key is pressed, a query string for identifying the cause may be added to the URL. For example, adding "hardkey=reset" to the URL makes it possible to issue an HTTP request for URL http://example.com/app1/scan?hardkey=reset. With this configuration, the Web application can easily distinguish between a case in which the top URL of the Web application is obtained upon a transition from the top menu to the browser, and that in which the top URL is obtained upon pressing the reset key. This makes it easy to configure a Web application which resets the internal states such as an operation mode, the settings of which are changed from the initial values in accordance with the operation input for the Web application, to the initial states. In this case, the internal states may be reset to the initial states only when a transition to the top URL is made especially upon pressing the reset key.

Again, if the browser obtains the URL when a hard key is pressed, a query string for identifying the screen displayed on the browser at that time may be added to the URL. For example, adding "current=http://example.com/app1/scan/option/scan-settings/" to the above-mentioned example makes it possible to issue an HTTP request for URL http://example.com/app1/scan?hardkey=reset&current=http %3A %2F %2Fexample.com %2Fapp1%2Fscan %2Foption %2Fscan-settings %2F. The symbols in the query string are encoded by so-called "URL encoding (Percent-Encoding)". With this configuration, the Web application can easily determine which screen is being displayed when the reset key is pressed.

<Second Embodiment>

The second embodiment according to the present invention will be described below with reference to FIGS. 12 to 14. In the first embodiment, a function selection screen is provided by the native function module 530. In contrast, in this embodiment, a function selection screen is provided by a Web application 510 (first application). When a function selection screen is provided by the Web application 510, a function ID table 1001 and application URL table 1101 are not always stored in a table 563. A case in which the function ID table 1001 and application URL table 1101 are not stored in the table 563 will be explained below.

<Operation when the Reset Key is Pressed>

Figure 12A:
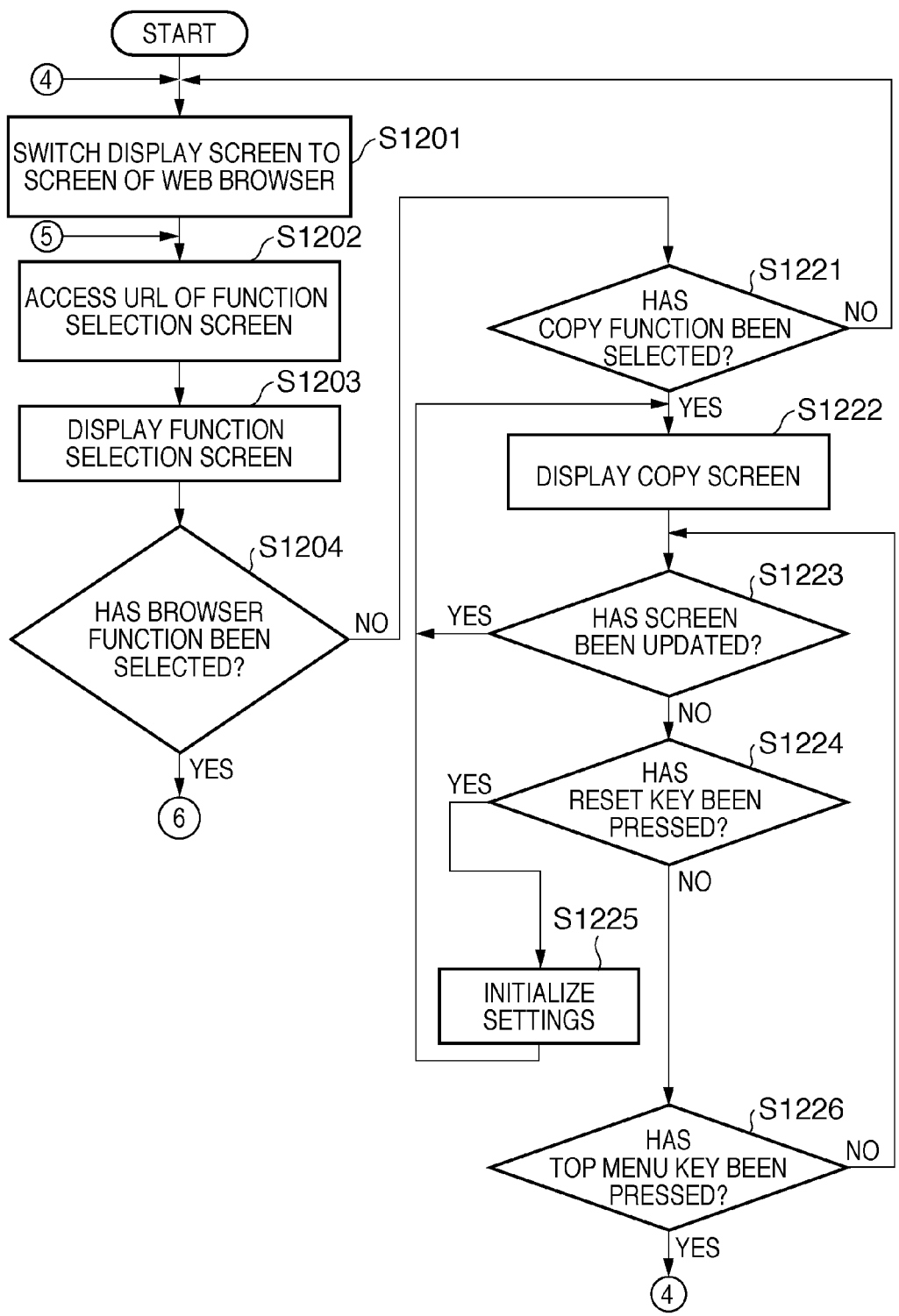

An operation when a reset key is pressed during the operation of a Web browser 540 will be described first with reference to FIGS. 12A and 12B. The process to be described hereinafter is implemented by executing a control program by a CPU 211 of an MFP 101. In step S1201, a native function module 530 switches the display screen to the screen of the Web browser 540 to display a function selection screen provided by the Web application 510. In step S1202, the Web browser 540 accesses the URL of the function selection screen, and the process advances to step S1203. In step S1203, the Web browser 540 obtains screen information and displays the function selection screen. Reference numeral 1301 in FIG. 13 denotes a function selection screen provided by the Web application 510.

In step S1204, the Web browser 540 determines whether the user has selected a browser function via the function selection screen 1301. If the user has selected the browser function, the Web browser 540 looks up a URL for making a transition to the selected function, and the process advances to step S1205; otherwise, the process advances to step S1221. On the function selection screen 1301 shown in FIG. 13, a URL for making a transition to each function of the Web browser 540 is assigned to a function button for using the function. In this case, on the function selection screen 1301, a scan function (Scan) 1302, print function (Print) 1303, and Fax function (Fax) 1304 are implemented using the Web browser 540. A copy function (Copy) 1305 is implemented by a native application which does not use the Web browser 540.

In step S1205, the Web browser 540 stores the URL of the Web page which is currently being displayed on the Web browser 540 in a RAM 213 as the last URL. In other words, the last URL is a URL accessed immediately before the occurrence of a screen transition. In step S1206, the Web browser 540 accesses the URL specified by the look-up in step S1204, and the process advances to step S1207. In step S1207, the Web browser 540 displays the screen. The Web browser 540 then accesses a Web server 102 to use the function of the Web application 510. The screen displayed at this time is the initial screen of the function of the Web application 510.

In step S1208, the Web browser 540 determines whether the last URL stored in step S1205 coincides with the URL of the function selection screen. The URL of one function selection screen may be set and stored on the Web browser 540, or a table describing the URLs of a plurality of function selection screens may be stored in the table 563 in advance. Reference numeral 1401 in FIG. 14 denotes a table describing the URLs of function selection screens. If the last URL coincides with the URL of the function selection screen, the process advances to step S1209; otherwise, the process advances to step S1210. In step S1209, the Web browser 540 stores the URL accessed in step S1206 (i.e., the URL which is currently being accessed) in the RAM 213 as a post-reset return destination URL (transition destination), and the process advances to step S1210.

In step S1210, the Web browser 540 determines whether a URL access instruction has been received upon the user's screen operation. If the URL access instruction has been received, the process returns to step S1205; otherwise, the process advances to step S1211. In step S1211, the Web browser 540 determines whether the reset key that is a hard key built in an operation unit 219 of the MFP 101 has been pressed. If the reset key has been pressed, the process advances to step S1212; otherwise, the process advances to step S1215. In step S1215, the Web browser 540 determines whether a link (top menu key) on the function selection screen 1301 has been pressed. If the link has been pressed, the process returns to step S1202; otherwise, the process returns to step S1210.

If it is determined in step S1211 that the reset key has been pressed, the process advances to step S1212. In step S1212, the Web browser 540 executes a session reset process as an initialization process, and the process advances to step S1213.

In step S1213, the Web browser 540 determines whether the post-reset return destination URL has been stored in the RAM 213. If the post-reset return destination URL has been stored, the process advances to step S1214. In step S1214, the Web browser 540 invokes the post-reset return destination URL stored in step S1209, and the process returns to step S1205. With this process, the display screen can return to the initial screen of the function of the Web application 510 upon pressing the reset key that is a hard key. In contrast, if it is determined in step S1213 that no post-reset return destination URL has been stored in the RAM 213, the Web browser 540 looks up, for example, a web page setting, and the process returns to step S1205. Note that the post-reset return destination URL stored in the RAM 213 in step S1209 may be cleared the moment the display screen returns to the function selection screen 1301 in step S1203 after the function of the Web application 510 is used, or may be cleared after the display screen returns to the function selection screen 1301 in step S1203 and another function is selected.

The processes in steps S1221 to S1226 after it is determined in step S1204 that the user has not selected the browser function are the same as those in steps S821 to S826, respectively, described with reference to the flowchart shown in FIGS. 8A and 8B, and a description thereof will not be given.

As described above, in this embodiment, the display screen can return to the initial screen irrespective of whether the reset key is pressed while the browser function is in progress or it is pressed when the copy function is in progress. In this manner, the information processing system and MFP 101 according to this embodiment can realize an identical operation regardless of the type of application in progress.

<Function Selection Screen>

The function selection screen 1301 which is used to use a function of the Web application 510 and provided by the Web application 510 will be described next with reference to FIG. 13. The function selection screen 1301 is displayed on the operation unit 219 of the MFP 101 as a Web page as the Web browser 540 accesses the URL of a function selection screen provided by the Web application 510. The Scan 1302 is a menu for using a scan function provided by the Web application 510. Similarly, the Fax 1304 is a Fax function, and the Print 1303 is a print function. On the other hand, the Copy 1305 is a menu for using a copy function provided by the native function module 530. On the function selection screen 1301, a URL for making a transition to each function of the Web browser 540 is assigned to a function button for using the function. If the user has selected a function (e.g., the Scan 1302), provided by the Web application 510, via the function selection screen 1301, the Web browser 540 accesses the URL of the selected function to make a transition from the current screen to the screen of the selected function.

<Function Selection Screen URL Table>

The function selection screen URL table 1401 stored in the table 563 will be described next with reference to FIG. 14. The function selection screen URL table 1401 is used to manage the URL of a function selection screen provided by the Web application 510. To determine in step S1208 whether the last URL is the function selection screen, it is necessary to allow the Web browser 540 to recognize the URL of the function selection screen. The Web browser 540 can obtain the URL of the function selection screen by registering, in the function selection screen URL table 1401 in advance, the URL of a function selection screen provided by the Web application 510.

Not one but a plurality of function selection screens may be present. For example, the function selection screen URL table 1401 shown in FIG. 14 defines the URLs of two function selection screens. A URL to provide a function selection screen common among all users who use the Web application 510 is defined in a row 1402. Also, a URL to provide a function selection screen which differs for each user who uses the Web application 510 is defined in a row 1403. Providing the function selection screen URL table 1401 makes it possible to store a post-reset return destination URL and, therefore, to realize an identical operation regardless of from which function selection screen the Web application 510 makes a transition to a function provided by the Web application 510.

<Third Embodiment>

The third embodiment according to the present invention will be described next with reference to FIGS. 15 and 16. In the second embodiment, a function selection screen is provided by the Web application 510, and the function ID table 1001 and application URL table 1101 are not stored in the table 563. However, since the function ID table 1001 and application URL table 1101 are not stored in the table 563, whether to store a post-reset return destination URL and whether to execute session resetting are not set for each function provided by the Web application 510.

When whether to store a post-reset return destination URL and whether to execute session resetting are to be set for each function provided by the Web application 510, a table which manages information regarding this setting can be separately provided. FIG. 16 shows an application management table 1601 in which whether to store a post-reset return destination URL and whether to execute session resetting are set for each function provided by a Web application 510. In the third embodiment, a function selection screen is provided by the Web application 510, and the application management table 1601 is stored in a table 563.

<Operation when the Reset Key is Pressed>

Figure 15A:
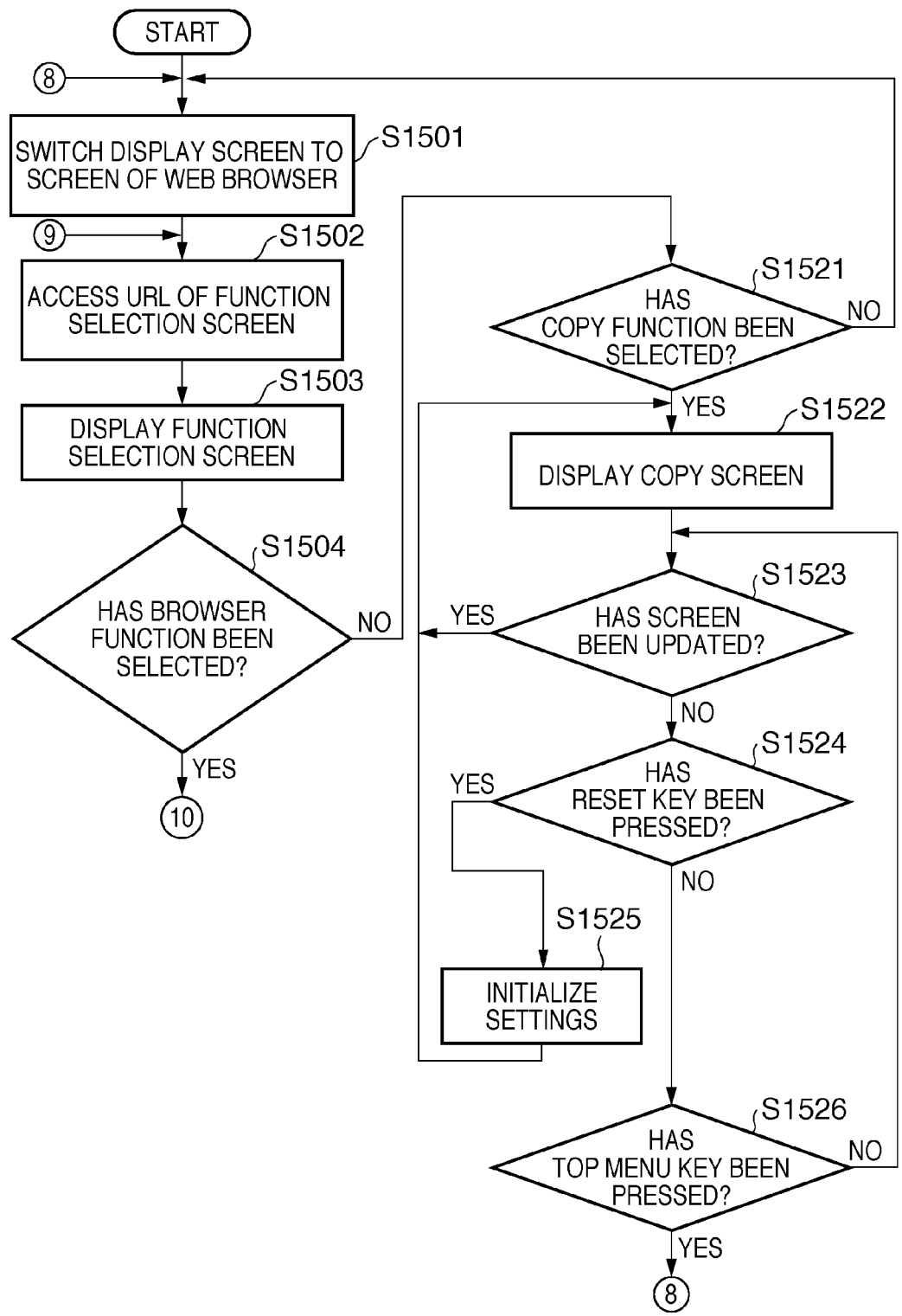
FIGS. 15A and 15B are a flowchart showing the procedure of a process when a reset key is pressed according to the third embodiment.
Figure 15B:
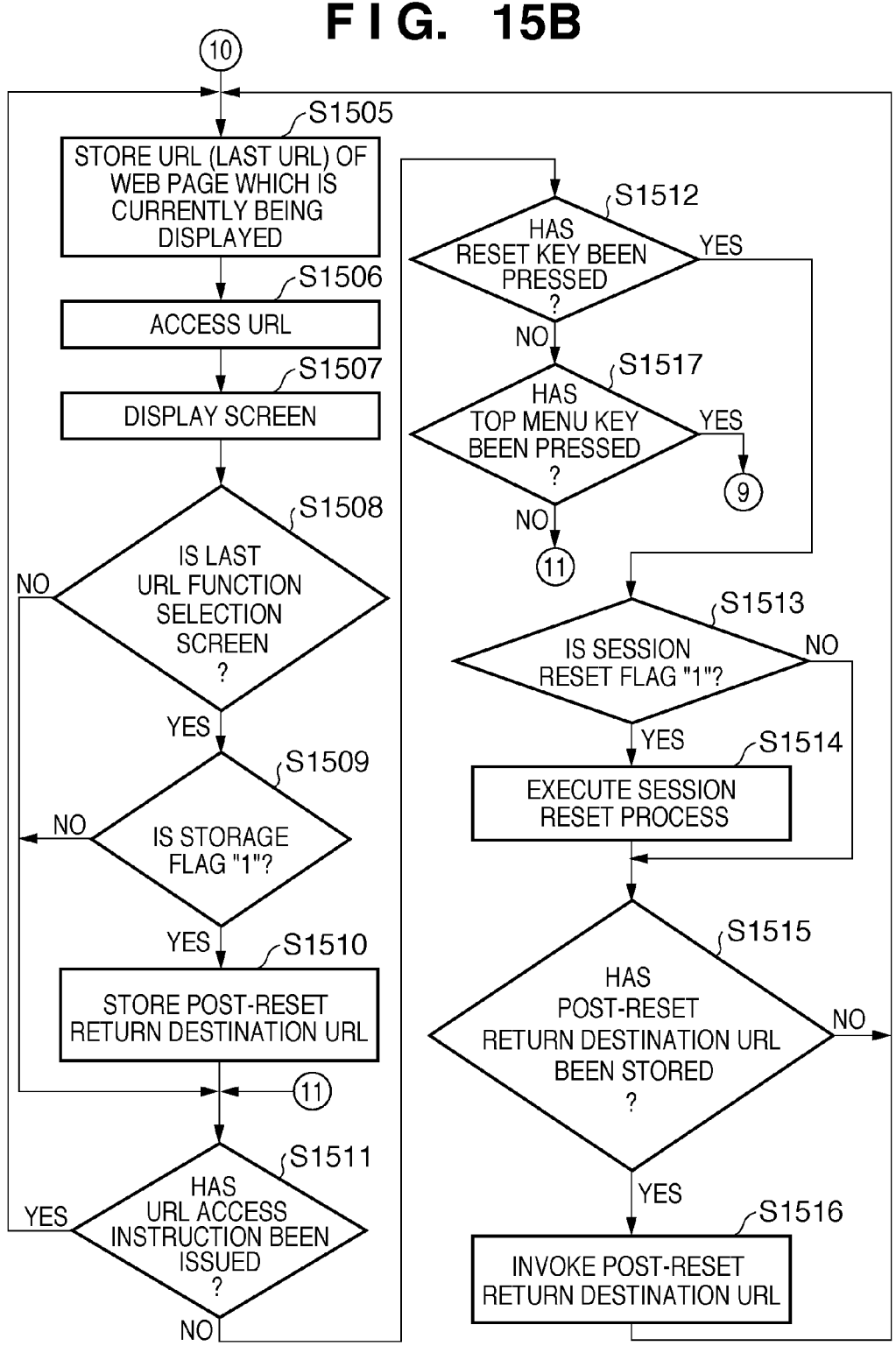

An operation when a reset key is pressed during the operation of a Web browser 540 will be described first with reference to FIGS. 15A and 15B. The process to be described hereinafter is implemented by executing a control program by a CPU 211 of an MFP 101. Note that since a flowchart shown in FIGS. 15A and 15B is obtained by adding determination as to whether to store a post-reset return destination URL, and as to whether to execute session resetting to the flowchart shown in FIGS. 12A and 12B, only their difference will be described.

In step S1509, the Web browser 540 looks up the application management table 1601 to determine whether a storage flag (storage information) associated with the URL accessed in step S1506 is "1". If the storage flag is "1", the process advances to step S1510. In step S1510, the Web browser 540 stores the URL accessed in step S1506 in a RAM 213 as a post-reset return destination URL. In contrast, if the storage flag is "0", the process skips step S1510 and directly advances to step S1511.

In step S1513, the Web browser 540 looks up the application management table 1601 to determine whether a session reset flag is "1". If the session reset flag is "1", the process advances to step S1514. In step S1514, the Web browser 540 executes a session reset process as an initialization process. In contrast, if the session reset flag is "0", the process skips step S1514 and directly advances to step S1515.

As described above, in this embodiment, whether to store a post-reset return destination URL and whether to execute session resetting can be selected for each function provided by the Web application 510 even if a function selection screen is provided by the Web application 510. Also, according to this embodiment, whether to execute a session reset process can be registered in association with a specific application.

<Application Management Table>

The application management table 1601 stored in the table 563 will be described next with reference to FIG. 16. The application management table 1601 is used to manage whether to store a post-reset return destination URL and whether to execute session resetting, for each function provided by the Web application 510. Each function provided by the Web application 510 is identified using a URL. The storage flag and session reset flag in the application management table 1601 are the same as in the application URL table 1101, and a description thereof will not be given.

As has been described above, the information processing apparatus according to each of the first to third embodiment displays a selection screen for selecting and executing a Web application or a native application, and registers a screen transition destination when a predetermined key is pressed upon the selection of the Web application via the selection screen. Moreover, when the predetermined key is pressed, the information processing apparatus looks up the registered transition destination and displays a corresponding screen on the display unit if the Web application is in progress, and displays a predetermined screen on the display unit if the native application is in progress. Hence, the information processing apparatus can provide the user the same operability between the Web application and the native application. In other words, the information processing apparatus can perform an identical operation when a predetermined key is pressed, regardless of whether a Web application provided by an external apparatus or a native application provided by itself is in progress.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-225571 filed on Sep. 29, 2009, and No. 2010-143027 filed on Jun. 23, 2010, which are hereby incorporated by reference herein in their entirety.

What is claimed is:

1. An information processing apparatus, comprising:
an input unit having a plurality of hardware keys including at least a reset key;
a registration unit that registers URLs, each of which corresponds to a web page as an initial screen;
an obtaining unit that obtains a first web page based on a first URL of the URLs registered by said registration unit, when the reset key is pressed while a user operation relating to the first web page is in progress, and obtains a second web page based on a second URL of the URLs registered by said registration unit, when the reset key is pressed while a user operation relating to the second web page is in progress; and
a display unit that displays the first or second web page obtained by said obtaining unit as the initial screen.

2. The apparatus according to claim 1, wherein the reset key is a key used to execute a reset process in an application that is in progress, and
the information processing apparatus further comprises a control unit that executes an initialization process of the application that is in progress, when the reset key is pressed.

3. The apparatus according to claim 2, wherein said registration unit further registers information regarding whether or not to reset a session in the initialization process.

4. The apparatus according to claim 1, wherein the information processing apparatus comprises a scan function and a print function,
the first web page is a web page for using the scan function, and
the second web page is a web page for using the print function.

5. The apparatus according to claim 1, further comprising a storage unit that stores a URL upon selection of a specific application in association with the reset key,
wherein said obtaining unit obtains the first web page and the second web page by referring to the URL stored in the storage unit.

6. The apparatus according to claim 1, further comprising:
a function selection screen display unit configured to display a function selection screen including functions corresponding to the registered URLs; and
a storage unit configured to store, as a return destination URL, a URL corresponding to the selected function when selecting one of the functions over the function selection screen.

7. A control method for an information processing apparatus comprising an input unit having hardware keys including at least a reset key, comprising:
registering URLs, each of which corresponds to a web page as an initial screen,
obtaining a first web page based on a first URL of the URLs registered by said registering step, when the reset key is pressed while a user operation relating to the first web page is in progress, and obtaining a second web page based on a second URL of the URLs registered by said registering step, when the reset key is pressed while a user operation relating to the second web page is in progress; and
displaying the first or second web page obtained in the obtaining step as the initial screen.

8. A non-transitory computer-readable storage medium storing a computer program for causing a computer to execute a control method for an information processing apparatus comprising an input unit having hardware keys including at least a reset key, the program comprising:
registering URLs, each of which corresponds to a web page as an initial screen;
obtaining a first web page based on a first URL of the URLs registered by said registering step, when the reset key is pressed while a user operation relating to the first web page is in progress, and obtaining a second web page based on a second URL of the URLs registered by said registering step, when the reset key is pressed while a user operation relating to the second web page is in progress; and
displaying the first or second web page obtained in the obtaining step as the initial screen.

* * * * *